(12) United States Patent  (10) Patent No.: US 7,779,220 B1
Pione  (45) Date of Patent: Aug. 17, 2010

(54) PASSWORD-BASED MEDIA CARTRIDGE AUTHENTICATION

(75) Inventor: Anthony E. Pione, Irvine, CA (US)

(73) Assignee: Quantum Corporation, San Jose, CA (US)

( * ) Notice: Subject to any disclaimer, the term of this patent is extended or adjusted under 35 U.S.C. 154(b) by 560 days.

(21) Appl. No.: 11/686,891

(22) Filed: Mar. 15, 2007

(51) Int. Cl.
G06F 12/00 (2006.01)
G06F 13/00 (2006.01)
G06F 13/28 (2006.01)
G06F 7/04 (2006.01)
G06F 12/14 (2006.01)
G06F 17/30 (2006.01)
G06F 1/26 (2006.01)
G06F 11/00 (2006.01)
G11C 7/00 (2006.01)
G08B 13/00 (2006.01)
G08B 21/00 (2006.01)
G08B 29/00 (2006.01)

(52) U.S. Cl. .......................... 711/164; 726/21; 726/34; 711/E12.095

(58) Field of Classification Search .................. 711/146
See application file for complete search history.

(56) References Cited

U.S. PATENT DOCUMENTS

| | | | |
|---|---|---|---|
| 5,065,262 A | 11/1991 | Blackborow |
| 5,297,067 A | 3/1994 | Blackborow |
| 5,483,419 A | 1/1996 | Kaczeus |
| 5,584,709 A | 12/1996 | Kiat |
| 5,917,795 A | 6/1999 | Furukawa et al. |
| 5,937,066 A * | 8/1999 | Gennaro et al. ............. 380/286 |
| 5,989,045 A | 11/1999 | Kimura |
| 6,295,180 B1 | 9/2001 | Sawada |
| 6,388,591 B1 | 5/2002 | Ng |
| 6,540,528 B2 | 4/2003 | Brodsky |
| 6,545,865 B2 | 4/2003 | Albrecht |

(Continued)

OTHER PUBLICATIONS

Xbox Hard Drive Locking Mechanism, Mar. 11, 2006, http://www.xbox-linux.org/wiki/Xbox_Hard_Drive_Locking_Mechanism.*

(Continued)

*Primary Examiner*—Hetul Patel
*Assistant Examiner*—Ralph A Verderamo, III
(74) *Attorney, Agent, or Firm*—Baker Botts L.L.P.

(57) ABSTRACT

The present invention, in particular embodiments, is directed to methods, apparatuses and systems directed to the authentication of cartridge-based storage media. In a particular embodiment, the present invention provides authentication passwords that are stored on authorized cartridge-based hard disc drives. The authentication password, in one embodiment, is a hash of an interleaved combination of a cartridge-based hard disc drive's serial number and model number strings. Upon insertion of a locked cartridge-based hard disc drive into a carrier, carrier logic obtains the serial number and model number strings of the hard disc drive and generates a password additionally using a base string. The carrier logic then attempts to unlock/authenticate the cartridge-based hard disc drive with the newly-generated password. Authentication occurs with an authorized cartridge as the password contained in the associated hard disc drive will match the password sent by the carrier logic. Unauthorized cartridge passwords are typically generated without knowledge of the base string or algorithm. Due to that, compatibility with associated carriers is prevented.

7 Claims, 9 Drawing Sheets

U.S. PATENT DOCUMENTS

| | | | |
|---|---|---|---|
| 6,546,495 | B1 | 4/2003 | Shimura et al. |
| 6,628,474 | B1 | 9/2003 | Parman |
| 6,633,445 | B1 | 10/2003 | Wilke |
| 6,636,942 | B2 | 10/2003 | Grecco |
| 6,699,070 | B1 | 3/2004 | Wu |
| 6,717,762 | B1 | 4/2004 | Bauck |
| 6,722,895 | B1 | 4/2004 | Brodsky |
| 6,733,335 | B2 | 5/2004 | Wu |
| 6,767,235 | B2 | 7/2004 | Wu |
| 6,771,448 | B2 | 8/2004 | Blair |
| 6,790,052 | B2 | 9/2004 | Schmidgall |
| 6,814,583 | B1 | 11/2004 | Young |
| 6,837,718 | B2 | 1/2005 | Brodsky |
| 6,854,982 | B2 | 2/2005 | Brodsky |
| 6,932,649 | B1 | 8/2005 | Rothermel |
| 6,942,524 | B2 | 9/2005 | Wu |
| 6,945,823 | B2 | 9/2005 | Lee |
| 6,960,089 | B2 | 11/2005 | Lee et al. |
| 2003/0096517 | A1 | 5/2003 | Ho |
| 2003/0128454 | A1 | 7/2003 | Basham |
| 2003/0207600 | A1 | 11/2003 | Ho |
| 2004/0044802 | A1 | 3/2004 | Chiang |
| 2004/0064598 | A1 | 4/2004 | Nakano |
| 2004/0169996 | A1 | 9/2004 | Paul |
| 2005/0086459 | A1 | 4/2005 | Cho |
| 2005/0102528 | A1* | 5/2005 | Tan et al. .................... 713/193 |
| 2006/0010285 | A1 | 1/2006 | Georgis |
| 2006/0010458 | A1* | 1/2006 | Georgis ..................... 720/600 |
| 2006/0026381 | A1* | 2/2006 | Doi et al. ................... 711/207 |
| 2007/0089169 | A1* | 4/2007 | Chung ........................ 726/19 |

OTHER PUBLICATIONS

Juan Chamero, "Something about random and hashing", Apr. 2006, www.intag.org/downloads/ds_010.htm.*

Linear feedback shift register, from www.Wikipedia.com, the free encyclopedia, retrieved on Feb. 11, 2007, URL = http://en.wikipedia.org/wiki/Linear_feedback_shift_register.

Stream cipher, from www.Wikipediacom, the free encyclopedia, retrieved on Feb. 5, 2007, URL = http://en.wikipedia.org/wiki/Stream_cipher.

* cited by examiner

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| SP | SP | SP | SP | S1 | S2 | S3 | S4 | S5 | S6 | S7 | S8 | S9 | S10 | S11 | S12 |

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| M1 | M2 | M3 | M4 | M5 | M6 | M7 | M8 | M9 | M10 | M11 | M12 | M13 | M14 | SP | SP |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| SP |  | SP |  | SP |  | SP |  | S1 |  | S2 |  | S3 |  | S4 |  | S5 |  | S6 |  | S7 |  | S8 |  | S9 |  | S10 |  | S11 |  | S12 |  |
|  | M1 |  | M2 |  | M3 |  | M4 |  | M5 |  | M6 |  | M7 |  | M8 |  | M9 |  | M10 |  | M11 |  | M12 |  | M13 |  | M14 |  | SP |  | SP |

← 501
← 502
← 504

These two strings are interleaved and merged to generate the following intermediate PW string

| SP | M1 | SP | M2 | SP | M3 | SP | M4 | S1 | M5 | S2 | M6 | S3 | M7 | S4 | M8 | S5 | M9 | S6 | M10 | S7 | M11 | S8 | M12 | S9 | M13 | S10 | M14 | S11 | SP | S12 | SP |
|---|---|---|---|---|---|---|---|---|---|---|---|---|---|---|---|---|---|---|---|---|---|---|---|---|---|---|---|---|---|---|---|

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|

← 501

Intermediate string

| Q1 | M1 | Q2 | M2 | Q3 | M3 | Q4 | M4 | S1 | M5 | S2 | M6 | S3 | M7 | S4 | M8 | S5 | M9 | S6 | M10 | S7 | M11 | S8 | M12 | S9 | M13 | S10 | M14 | S11 | Q5 | S12 | Q6 |
|---|---|---|---|---|---|---|---|---|---|---|---|---|---|---|---|---|---|---|---|---|---|---|---|---|---|---|---|---|---|---|---|

PASSWORD-BASED MEDIA CARTRIDGE AUTHENTICATION

CROSS-REFERENCE TO RELATED APPLICATIONS

This application makes reference to the following commonly owned U.S. patent applications, which are incorporated herein by reference in their entirety for all purposes:

U.S. patent application Ser. No. 10/940,111 in the name of John A. Hamming, entitled "Cartridge Carrier;"

U.S. patent application Ser. No. 10/964,844 in the name of Patrick H. McCormack and John A. Hamming, entitled "Lockable Ejection System and Method;" and U.S. patent application Ser. No. 11/182,843 in the name of Anthony E. Pione and Richard M. Andrews, entitled "Data Flow Control and Bridging Architecture Enhancing Performance of Removable Data Storage Systems."

TECHNICAL FIELD

The present disclosure generally relates to a cartridge-based data storage device that includes a hard disk drive and, more particularly, to a data storage device in which the hard disk drive is removable from a carrier installed in a host computing system.

BACKGROUND

As the value and use of information increases, individuals and businesses seek additional ways to process and store information. One aspect of this evolution has been a progressively growing demand for increased storage capacity in portable memory devices. With the advent of personal computers and workstations, it is often desirable or necessary to remove the medium on which digital data is stored. A user may desire to remove a storage medium to carry it to a different site and/or a different computer system. It may also be desirable to remove the storage medium to a secure location when the stored computer data is sensitive, secret, or a back-up copy is needed. One option is the use of hard disk drives contained in removable cartridges.

Removable hard disk drives are typically housed in a larger shell or cartridge having isolating materials to protect the hard disk drive from dirt or other contaminates, or from a free fall onto a hard surface. Thus, a cartridge 100 (FIG. 1) may be a ruggedized container that houses a hard disk drive. The cartridge is then connected to a larger computer system or network via a carrier installed in a desktop or server system. The carrier typically includes interface and control circuits to operably connect the hard disk drive inserted into the carrier to the motherboard of the host desktop or server system. Either the original cartridge is reinserted or a different cartridge can be inserted back into the carrier installed in the desktop or server. This insertion/removal cycle may occur several times throughout the work day.

SUMMARY

The present invention, in particular embodiments, is directed to methods, apparatuses and systems directed to the authentication of cartridge-based storage media. In a particular embodiment, the present invention provides authentication passwords that are stored on authorized cartridge-based hard disc drives. The authentication password, in one embodiment, is a hash of an interleaved combination of a cartridge-based hard disc drivers serial number and model number strings. Upon insertion of a locked cartridge-based hard disc drive into a carrier, carrier logic obtains the serial number and model number strings of the hard disc drive and generates a password additionally using a base string. The carrier logic then attempts to unlock/authenticate the cartridge-based hard disc drive with the newly-generated password. Authentication occurs with an authorized cartridge as the password contained in the associated hard disc drive will match the password sent by the carrier logic. Unauthorized cartridge passwords are typically generated without knowledge of the base string or algorithm. Due to that, compatibility with associated carriers is prevented.

The following embodiments and aspects thereof are described and illustrated in conjunction with systems, apparatuses and methods which are meant to be exemplary and illustrative, not limiting in scope. In various embodiments, one or more of the above-described problems have been reduced or eliminated. In addition to the aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be illustrative, not limiting in scope.

Figure 1:
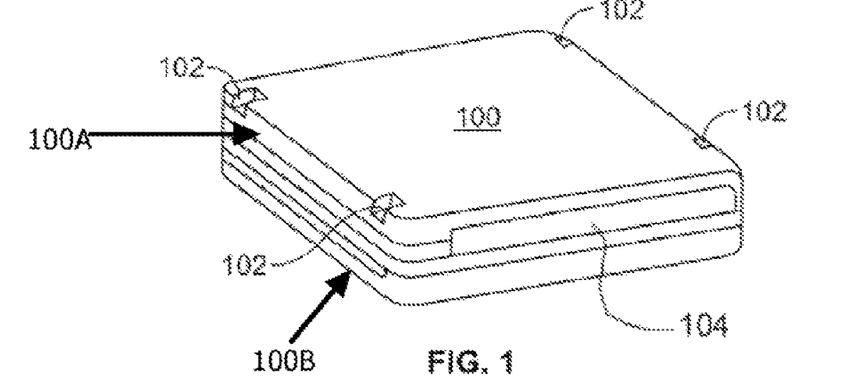
FIG. 1 illustrates an embodiment of a removable cartridge containing a hard disk drive data storage system, in accordance with an example embodiment.

For didactic purposes, an embodiment of the present invention operates in connection with the removable cartridge system illustrated in FIGS. 1, 2A, 2B and 3. The present invention, however, can operate in connection with a vast array of removable media systems. FIG. 1 illustrates an embodiment of a removable cartridge. The cartridge 100 may be any shape or size necessary for its use. The cartridge 100 may have notches 102 and orientation tab channel 104 to assist in the positioning of the cartridge 100 in the carrier and to allow a user to visually ascertain that the cartridge 100 is properly inserted into the carrier. Cartridge 100 further includes a top part 100A and a bottom part 100B, both of which are further illustrated via FIG. 5.

Figure 2A:
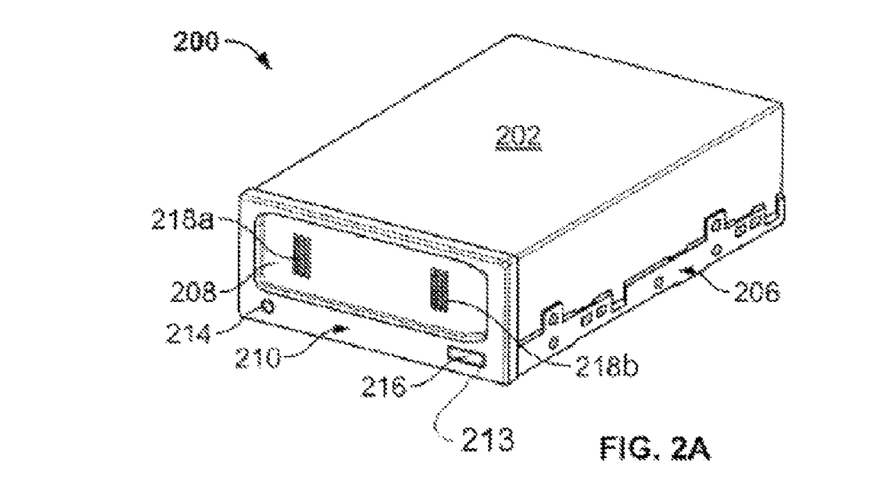
FIGS. 2A and 2B illustrate an embodiment of a cartridge carrier, in accordance with an example embodiment.
Figure 2B:
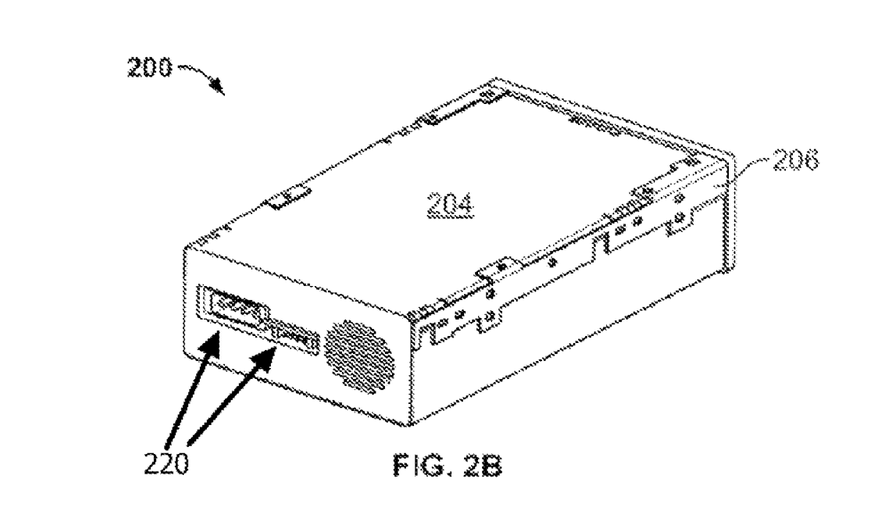
Figure 3:
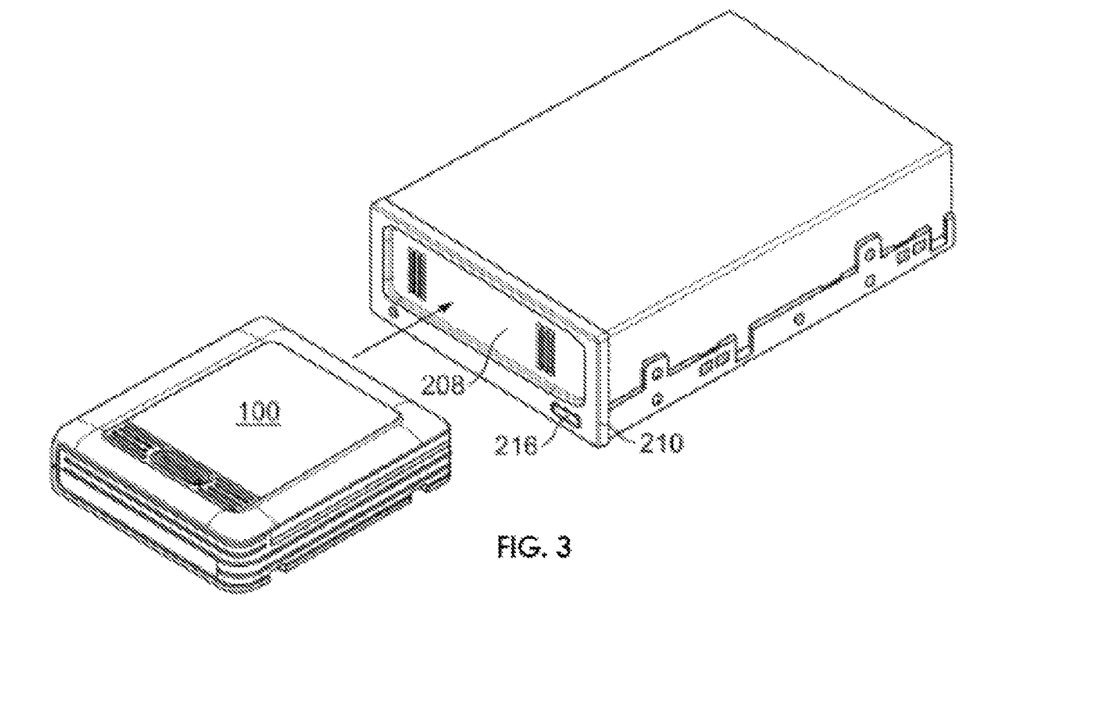
FIG. 3 illustrates insertion of the removable cartridge into the cartridge carrier, in accordance with an example embodiment.

FIGS. 2A and 26 are diagrams of a cartridge carrier according to one implementation of the present invention. The cartridge carrier 200, in one implementation, is a docking mechanism into which the cartridge 100 is inserted. As discussed in more detail below, the cartridge carrier 200 provides the interconnection between the motherboard of the host computing device and the target hard disk drive 70 contained in the cartridge 100. The cartridge carrier 200 may have a top cover 202, a bottom cover 204, and a base 206 thereby forming an enclosure. The base 206 connects the bottom cover 204 and the top cover 202 and is positioned within the enclosure. The cartridge carrier 200 may be designed to fit into a 3.5 inch form factor for installation into a bay of a desktop or server box. The carrier 200 may be made of any dimensions necessary, but may have an outside dimension of about between 90-110 mm width, 30-50 mm height, and about 130-190 mm length. As FIG. 26 illustrates, the cartridge carrier 200 includes a connector assembly 220 to allow for a physical connection between the host computing device and the cartridge carrier electronics discussed below. Of course, other implementations are possible. For example, the carrier may be a stand-alone unit, such as a dock that is external from a host computing system.

The cartridge carrier 200, in one implementation, has an opening assembly 210 to provide access to the enclosure and to guide the cartridge 100 into the carrier. The opening assembly 210 may have a door 208, a light pipe opening 214, and an eject button 216. The opening assembly 210 may be contoured to the profile of the carrier 200, and may be larger in height and width than the carrier 200. The opening assembly 210 may be removably connected to the carrier 200 by any means such as snap fit, friction fit, attached with an adhesive, and the like. The door 208 may be designed to be spring closed when a cartridge is not present and may contain a plurality of risers 218a, 218b to contact the cartridge 100. The ridges reduce wear marks on the door and the cartridge 100. U.S. application Ser. Nos. 10/940,111 and 10/962,484 identified above, provide further details of the mechanical configuration and operation of the cartridge carrier system, such as the physical connection of the interface connectors between the data storage unit of the cartridge, upon insertion, to the corresponding interface connectors of the carrier.

Figure 4:
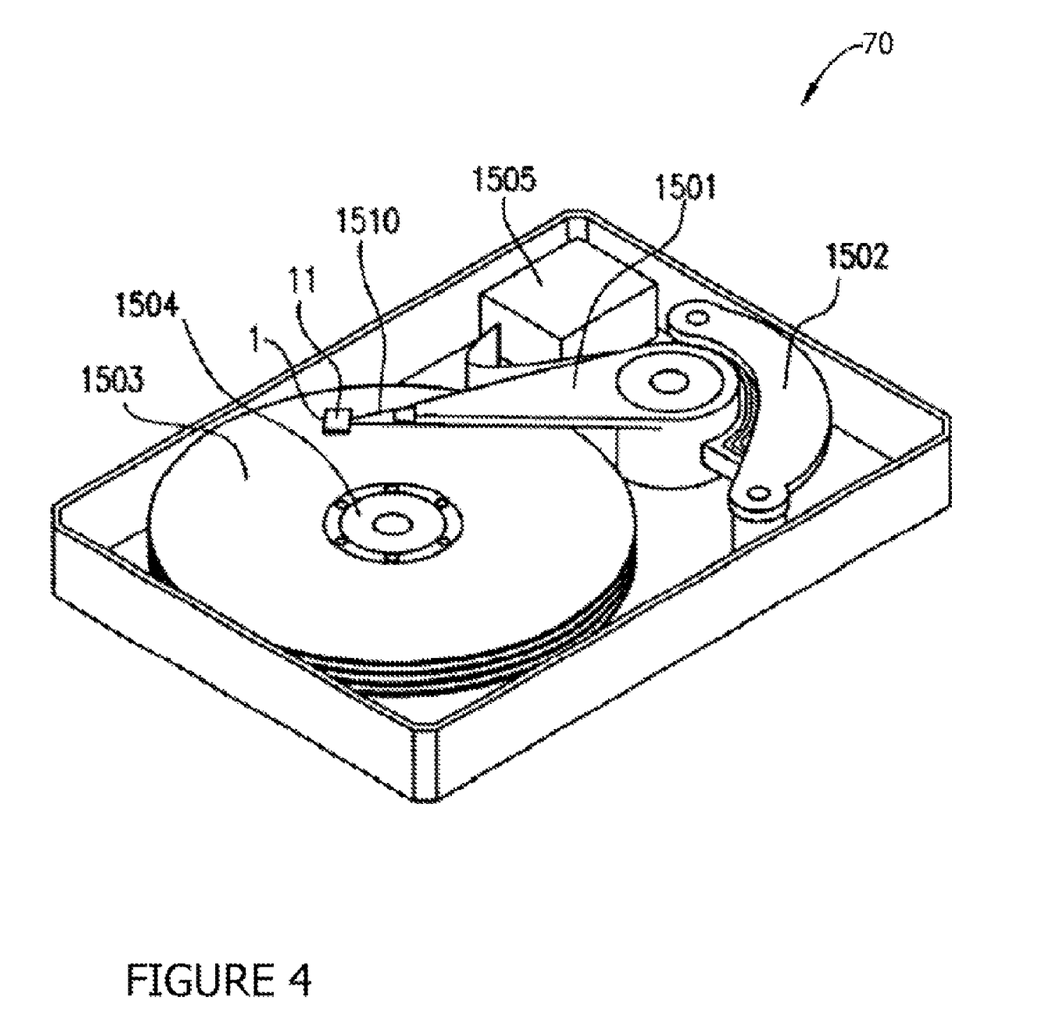
FIG. 4 illustrates a hard drive contained in the removable cartridge, in accordance with an example embodiment.

FIG. 4 illustrates a hard drive 70 contained in the cartridge 100, in accordance with an example embodiment. The hard disc drive 1500 includes a head actuator 1510 including a head slider 11 provided with a magnetic head 1, a head carriage 1501 for carrying the head actuator 1510, a linear or rotational voice coil motor 1502 for moving the magnetic head 1 via the head actuator 1510, a spindle motor 1504 for rotating a disc 1503, and control logic 1505.

The spindle motor 1504 rotates the disc 1503 at a prescribed speed. The voice coil motor 1502 moves the head actuator 1510 including the head slider 11 provided with the magnetic head 1 across a surface of the disc 1503 in a radial direction of the disc 1503, so that the magnetic head 1 can access a prescribed data track on the disc 1503. The head 1 then records information to or reproduces information from the disc 1503.

The head slider 11 for carrying the magnetic head 1 is, for example, an air bearing slider. In this case, the head slider 11 contacts the surface of the disc 1503 when the hard disc drive 1500 starts and stops operating. During the recording or reproduction of the hard disc drive 1500, the head slider 11 is held above the disc 1503 by the air bearing formed between the disc 1503 and the head slider 11.

Figure 5:
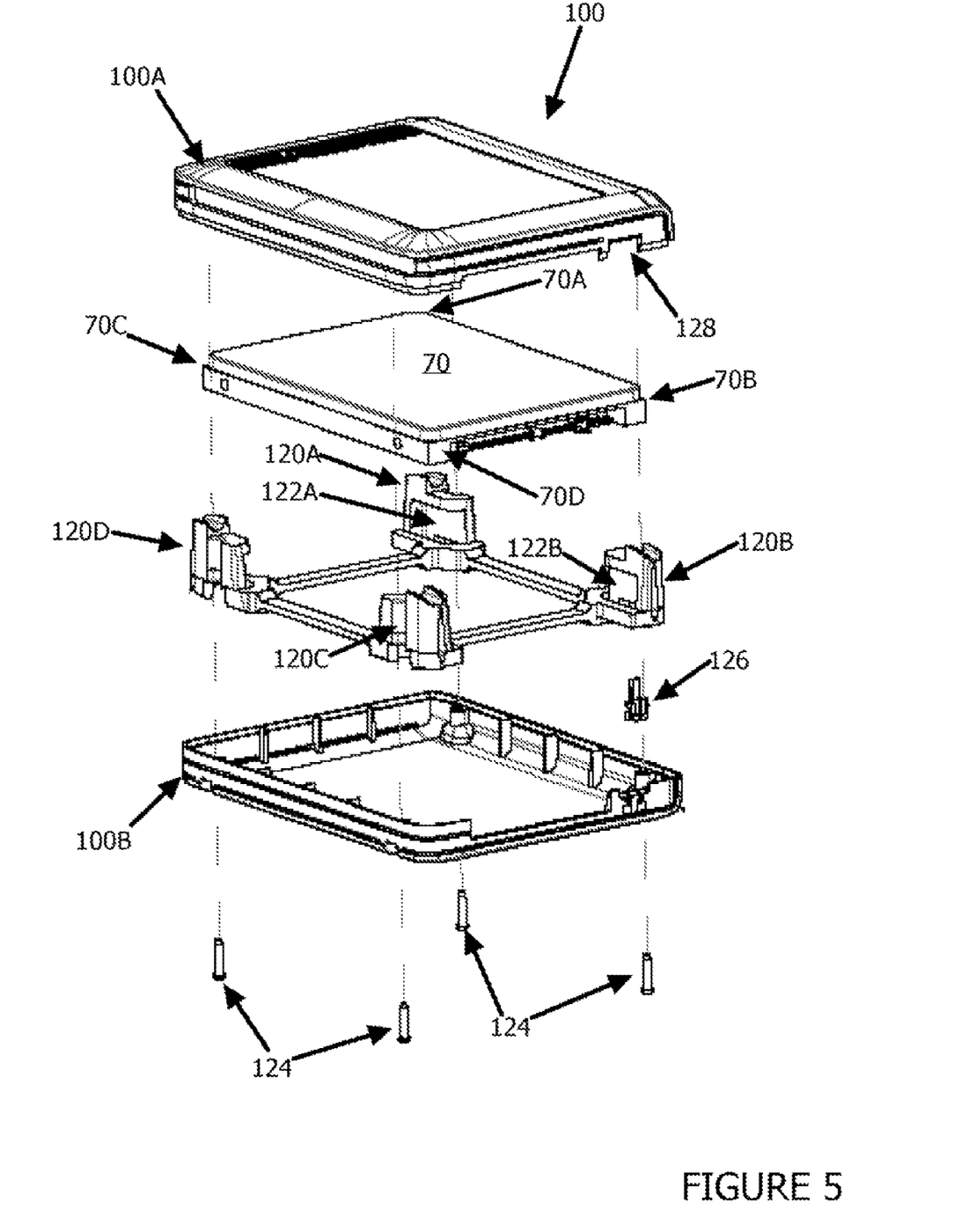
FIG. 5 illustrates a disassembled removable cartridge, in accordance with an example embodiment.

FIG. 5 illustrates a disassembled cartridge 100, in accordance with an example embodiment Included in FIG. 5 are top and bottom parts (100A, 100B) of the cartridge 100 as well as the drive 70. Also included are shock mounts (120A, 120B, 120C, 120D) that drive 70 rests within. For example, corners 70A and 70B of the drive 70 rests within the shock mounts 120A and 120B at locations 122A and 122B, respectively. The other drive corners 70C and 70D rest at similar locations at the other shock mounts 120C and 120D, respectively. Top and bottom parts (100A, 100B) of the cartridge 100 are fastened to each other by screws 124 when in an assembled state. Also included is a write protect tab 126 which slides in a window 128 formed when the top and bottom parts (100A, 100B) are assembled.

Figure 6:
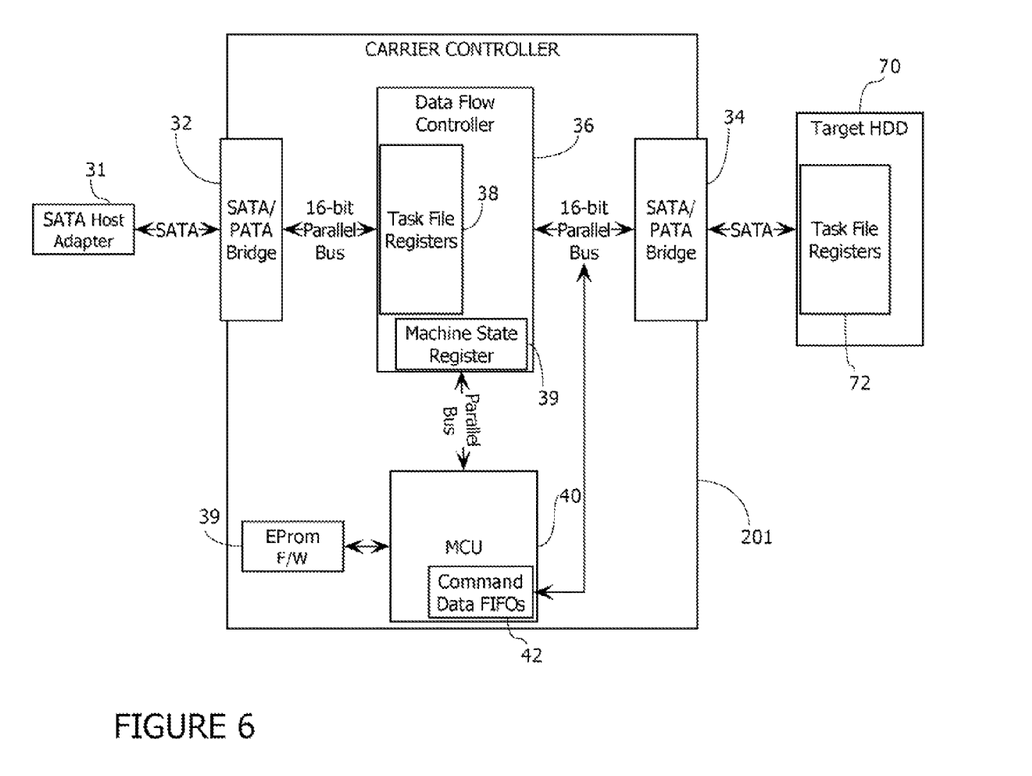
FIG. 6 is a functional block diagram illustrating a high-level system architecture of an example removable data storage unit system, in accordance with an example embodiment.

FIG. 6 is a functional block diagram illustrating a high-level system architecture including the main components of a carrier controller 201 and a removable data storage system—here, a target hard disk drive (HDD) 70. In one implementation, the system architecture of the carrier controller 201 generally comprises serial-to-parallel interface bridges 32, 34, data flow controller 36, microcontroller unit (MCU) 40 and an electronically programmable read-only memory (EE-PROM) circuit 39. As FIG. 6 illustrates, a cartridge-based hard disk drive (HDD) 70 (contained in cartridge 100) connects to the serial-to-parallel interface bridge 34, while the host adapter 31 on the motherboard of the host computer or server connects to the serial-to-parallel interface bridge 32. The drive 70 contains an interface controller that supports the standard ATA-6 command set. In one implementation, the target HDD 70 contained in cartridge 100 is a serial ATA (SATA) drive, which implements the standard ATA-6 command set. For example, the target HDD 70 may be a Serial ATA hard disk drive (2½") in capacities ranging from 40 GB to 160 GB or perhaps even larger capacities. The SATA interface standard defines a password unlock mechanism to prevent unauthorized access to data contained on the HDD 70. When locked, the HDD 70 responds in error to any attempt to access the media. However, some basic commands can be executed when the HDD 70 is in a locked state. One example of such a command is the Identify command. When an Identify command is issued to a locked HDD 70, the HDD 70 will respond with a serial number string that uniquely identifies the drive, as well as a model number string. In an unlocked state, the HDD 70, and the data stored thereon, can be accessed or modified using additional commands supported by the HDD 70, such as read and write commands. The password is typically stored in an EEPROM, flash memory or perhaps even the drive's 70 media itself.

In one implementation, the HDD 70 may include an interface (such as a SATA interface connector), one or more magnetic discs or platters, a drive motor that rotates the platters, one or more read/write heads (and associated actuators), and control logic operative to control the actuators and drive motor, as well as execute one or more commands (such as read or write commands) according to a storage protocol. The HDD 70 may also include an enclosure that seals the foregoing components with the interface externally accessible to a corresponding interface of carrier 200. In one implementation, the target HDD 70 is formatted with a FAT32 file system. The FAT32 file system is recognized by several operating systems including Microsoft® Windows®, Novell NetWare®, Apple MAC OS-X®, and Linux. In another implementation, the target HDD 70 is formatted with an NTFS file system. Of course, the target HDD 70 may support larger or smaller data capacities, and other file systems. In one implementation, the target HDD 70 includes a set of registers implementing an ATA task file 72, which is a conventional set of input/output registers having defined locations in memory to which both the host and target side have access. In one implementation, the serial to parallel interface bridge 34, therefore, provides the host mode SATA interface connection to the target SATA HDD 70.

In one implementation, the electronic components of the carrier controller 201 translate SATA-based ATAPI block commands/status responses from the SATA host adapter 31 to SATA-based ATA commands on the SATA drive interface of target HDD 70. In one implementation, the carrier controller 201 contains two SATA interfaces provided by interface bridge circuits 32, 34: the Carrier-to-Motherboard SATA interface, and the HDD- to-Carrier (Hot plug) SATA interface. Typically, the Carrier-to-Motherboard SATA interface 32 is connected at the time of carrier installation to the host computing device with the system power off, and presents a SATA device-mode physical interface to the host computing system. The HDD-to-Carrier (Hot plug) SATA interface is designed to allow insertion and removal of the cartridge 100 when carrier power is applied, and presents a SATA host-mode physical interface to the target HDD 70. The SATA/PATA interface bridges 32 and 34, in one implementation, are integrated circuits that convert SATA to Parallel ATA (PATA), and vice versa. Typically, the bridge circuits include processing logic and buffers to perform the requisite serial-to-parallel conversions. Any suitable SATA/PATA bridge circuit can be used, such as the 88SA8040 Serial ATA Bridge Chip offered by Marvell Semiconductor, Inc. of Sunnyvale, Calif., As FIG. 6 illustrates, a 16-bit parallel bus connects SATA/PATA bridge 32 to data flow controller 36, Data flow controller 36, in one implementation, implements an ATA/ATAPI task file maintained by task file register 38. The SATA/PATA bridge 32 maps the SATA connection with SATA host adapter 31 to the ATA/ATAPI task file register 38 maintained by the data flow controller 36. A second 16-bit parallel bus connects data flow controller 36 to SATA/PATA bridge 34. An additional parallel bus connects data flow controller 36 to microcontroller unit 40. Furthermore, as FIG. 6 illustrates, microcontroller unit 40 is also connected to the 16-bit parallel bus between data flow controller 36 and interface bridge 34 to allow for receipt and transmission of command data from and to the target HDD 70. Data flow controller 36 is operative to selectively direct the flow of data to either microcontroller unit 40 or SATA/PATA bridges 32, 34. Data flow controller 36 can be implemented in a variety of physical configurations. For example, data flow controller 36 can be a programmable logic circuit, such as a field-programmable gate array (FPGA), a complex programmable logic device (CPLD), or an application-specific integrated circuit (ASIC). In one implementation, the data flow controller 36 routes UDMA or DMA bursts between the bridge circuits 32 and 34 to enhance the speed of data transfer between the host system and the target HDD 70, but routes ATAPI commands to the microcontroller unit 40 for translation and execution.

Microcontroller unit 40, as discussed more fully below, intercedes in command block interpretation from the ATAPI command set and interface presented to host adapter 31 to the ATA command set and interface presented to target HDD 70. Microcontroller unit 40, in one implementation, is a microcontroller comprising an 8051 CPU core, random access memory (RAM), command data FIFOs 42 for storing command data, as well as peripheral and communications ports. A suitable microcontroller that can be used in an embodiment of the present invention is manufactured by Cypress Semiconductor Corporation of San Jose, Calif. under the model number CY7C68013. Of course, other CPU cores and other microcontroller units can be used. In one implementation, EEPROM circuit 39 stores firmware that is loaded into the RAM of microcontroller unit 40 at boot time. As discussed above, microcontroller unit 40 and data flow controller 36 communicate, in one implementation, over a parallel bus using a set of registers. In one implementation, the command data FIFOs 42 provide a buffer for command data, and comprise three separate FIFO structures. In one implementation, the command data FIFOs 42 include a first FIFO for receiving ATAPI command data from the host system, a second FIFO for receiving ATA command data from the target HDD 70, and a third FIFO that stores command data for transmission to either the target HDD 70 or the host system. For example, microcontroller unit 40 may translate an ATAPI command received from the host system and stored in a first FIFO of the command data FIFOs 42, and formulate and store an ATA command in memory for transmission to the target HDD 70 via interface bridge 34.

Data flow controller 36, in one implementation, maintains a machine state register 39 that the data flow controller 36 and the microcontroller unit 40 use to coordinate the processing of commands received from the host computing device. In one implementation, the microcontroller unit 40 and data flow controller 36 together read and write to a set of registers, such as a machine state register 39, that provide the communications interface between the two components and indicate the status of command processing. As discussed above, the data flow controller 36 maintains the ATAPI task file register 38 and responds to state changes in the task file register 38, such as a packet command being written into the control register of the task file 38. In some implementations, state changes in the ATAPI task file cause state changes in the machine state and other registers. For example, the machine state register 39, in one implementation, is a 4-bit register that state of which corresponds to various possible command processing states, such as an idle state, command states, data transfer states, and the like. Operation of the carrier and cartridge is further described in U.S. application Ser. No. 11/182,483, which is incorporated by reference herein.

The claimed embodiments will now be presented as the cartridge 100, carrier 200 and carrier controller 201 have been described. The claimed embodiments contemplate methods, apparatuses and systems directed to the authentication of cartridge-based storage media. In one implementation, the firmware or carrier logic of carrier 200 is configured to authenticate cartridges based on the authentication mechanisms described herein. The implementation described below provides authentication passwords that are stored on authorized cartridge-based hard disc drives. The authentication password, in a particular implementation, is a hash of an interleaved combination of a cartridge-based hard disc drive's serial number and model number strings. More specifically, a feedback XOR function reverse-bit processes the interleaved combination to generate the password. The feedback. XOR function has input taps to an initially-cleared register utilized for writing the password bit by bit. In an alternative embodiment, the register is initially set with the intermediate string. The password can be generated as part of the manufacturing processes and installed on the cartridge-based hard disc drive. Upon insertion of a locked cartridge-based, hard disc drive into a carrier, carrier logic obtains the hard disc drive's serial number and model number strings and generates a password additionally using a base string. In particular implementations, the base string is a proprietary secret string coded into the carrier logic (such as firmware, software, or hardware logic). The carrier logic then attempts to unlock/authenticate the cartridge-based hard disc drive with the newly-generated password. Authentication occurs with an authorized cartridge as the password contained in the associated hard disc drive will match the password sent by the carrier logic. Unauthorized cartridge passwords are typically generated without knowledge of the base string or password-generation algorithm. Due to that, compatibility with associated carriers is prevented.

Figure 9:
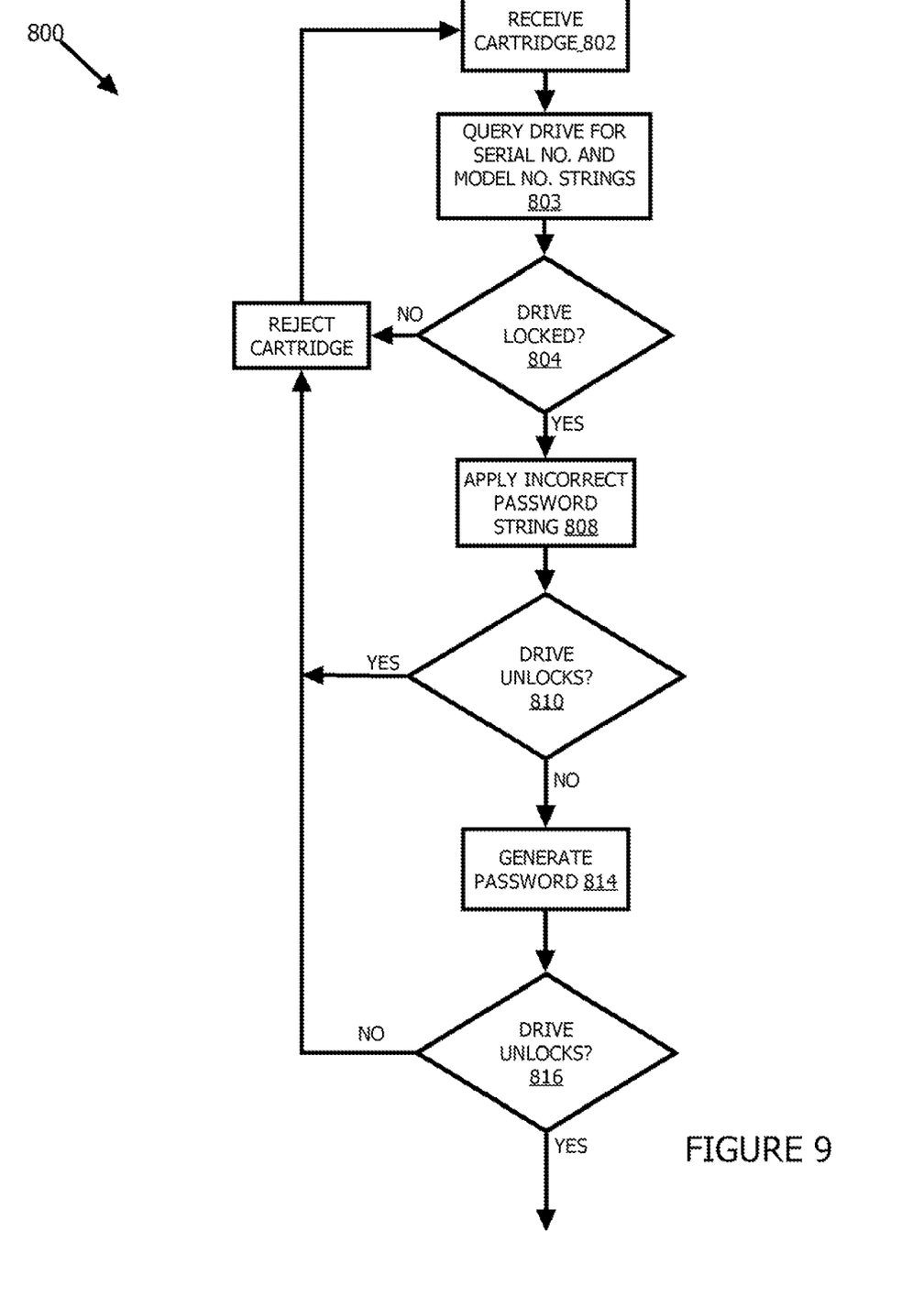
FIG. 9 is a flowchart diagram illustrating a method for authenticating a removable media cartridge, in accordance with an example embodiment.

In another implementation, a cartridge, such as cartridge 100, is rejected by a cartridge carrier, such as carrier 200, if the cartridge is initially not in a locked state by default when it is inserted into carrier 200. In yet another implementation, carrier controller 201 sends an intentionally-incorrect password to a locked HDD 70 upon insertion of cartridge 100 into carrier 200. If the HDD 70 unlocks, carrier 200 rejects HDD 70. This particular implementation thwarts attempts at getting past the authentication password of the claimed embodiments simply by configuring the HDD 70 to accept any password. FIG. 9 summarizes how the password string is generated, according to one possible implementation of the invention.

Generation of the password is illustrated via FIGS. 7A-9 and is typically executed by a processor of a station in a manufacturing system when a cartridge is manufactured or by a portion of MCU 40 when a cartridge 100 is inserted into carrier 200. In the context of a cartridge 100 being inserted into a carrier 200, method 700 of FIG. 8 involves MCU 40 accessing (702) a serial number string and a model number string from a hard disc drive of cartridge 100. The MCU 40 may modify (704) the serial number and model number strings as necessary. In one implementation, the model and serial number strings of a hard disc cartridge are accessed via Identity commands. Of course, other similar commands can be used with other storage media protocols. The MCU 40 may modify (704) the serial number and model number strings as necessary. This begins with scanning a serial number string and a model number string and removing leading spaces and nulls from those strings. In some instances, the model number string can be 40 bytes in length, typically containing either leading or trailing zeros or spaces. For a model number string, the string is scanned and leading and trailing zeros or spaces are removed. The model number string is then truncated to 16 bytes, if necessary, by using the first 16 bytes of non-null or non-space of the model number string and left-justifying the model number string in a 16 byte field. If the model number string is less than 16 bytes, spaces are used to pad out to 16 bytes on the right side of the string. The serial number string may be up to 20 bytes in length. In a particular implementation, after the leading/trailing spaces and nulls have been removed, the serial number string is also truncated to 16 bytes by removing the most significant (left most) bytes. If the serial number string is 16 bytes or less in length, it is right justified into a 16 byte field and the missing bytes on the left are temporarily filled with space characters.

Figure 7A:
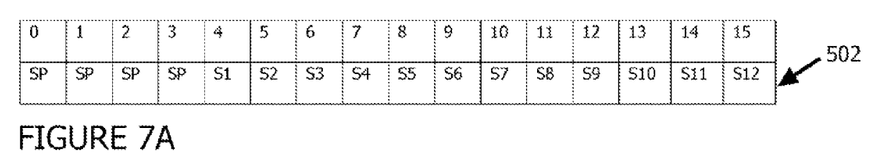
FIGS. 7A-7D are tables illustrating an interleaved combination of a enol number string, a model number string and a base string, in accordance with an example embodiment.
Figure 7B:
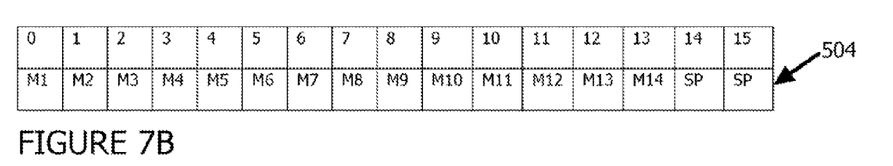
Figure 7C:
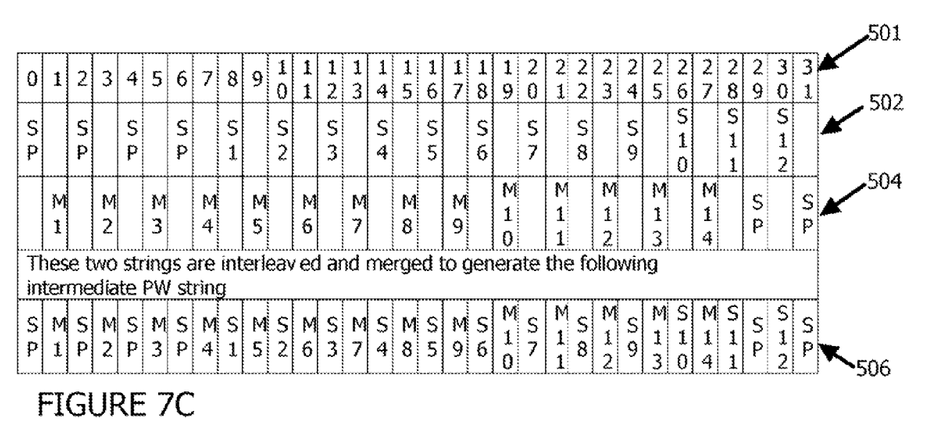
Figure 7D:
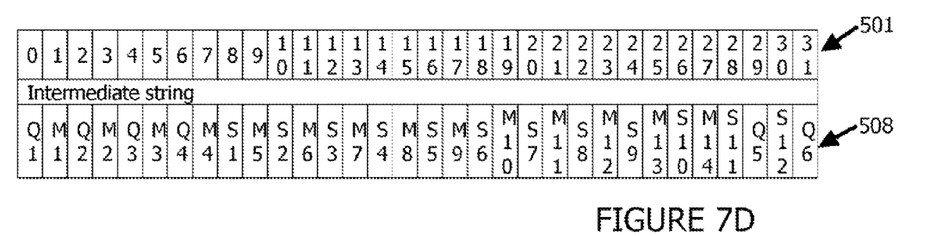
Figure 8:
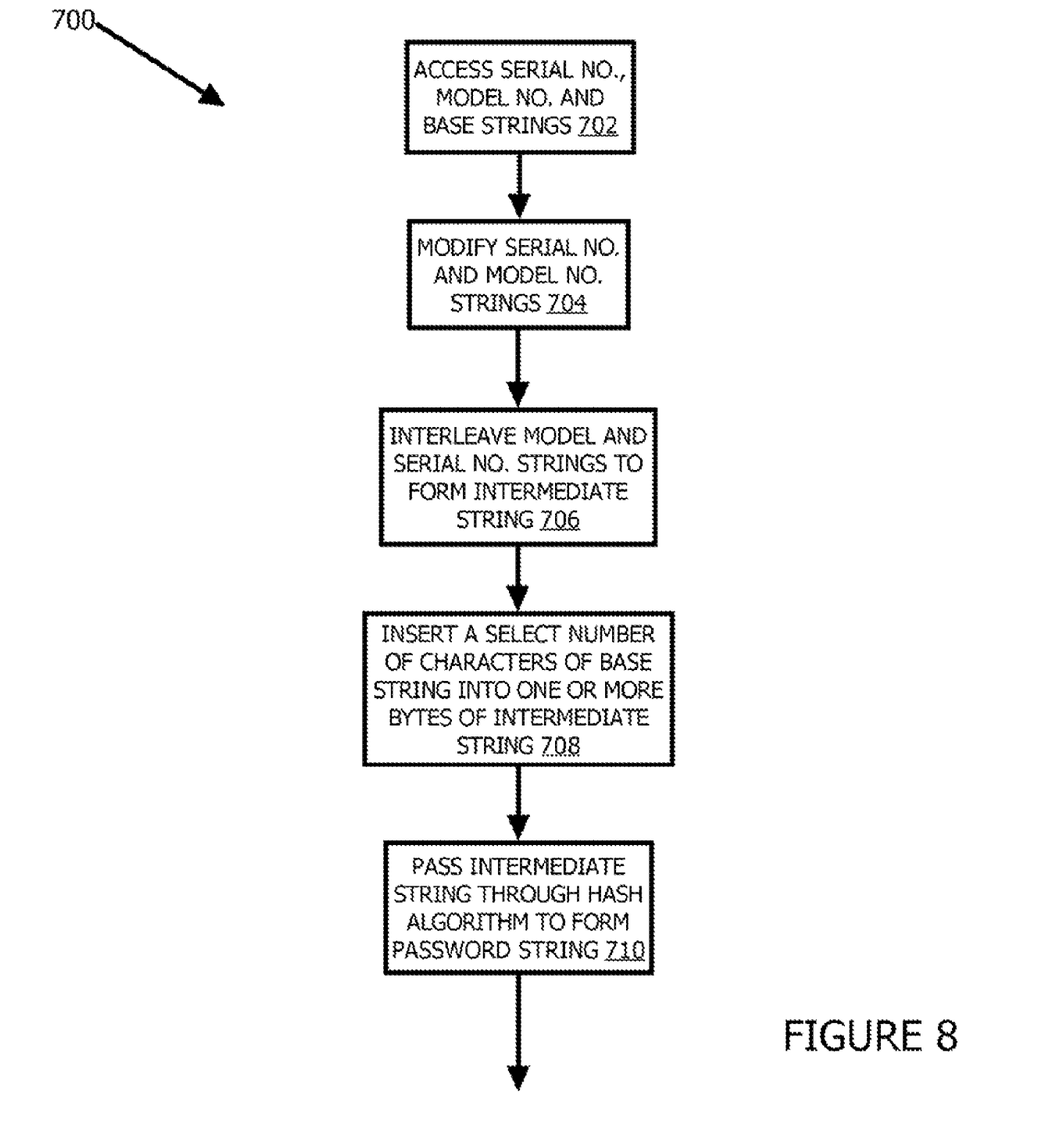
FIG. 8 is a flowchart diagram illustrating a method for generating a password to access a removable media cartridge, in accordance with an example embodiment.

Next, the serial number string in row 502 (refer to FIG. 7A) and model number string in row 504 (refer to FIG. 7B) are interleaved into an intermediate string at row 506 as indicated in FIG. 7C and operation 706 of FIG. 8. Each entry in the serial number string row 502 and model number string row 504 represents an 8 bit character. S1 through S12 and M1 through M14 each represents a byte of a serial number string and a model number string respectively. Each entry in row 501 represents an offset address, "SP" in serial number string row 502 and model string row 504 refers to inserted spaces. In the implementation shown, the serial number string is 12 bytes, requiring four SP characters on the left. Also, in the implementation shown, the model number string is 14 bytes thus requiring two SP characters on the right. The SATA specification specifies a password length of 32 characters or bytes. Typically, serial number strings and model number strings, after removing leading and/or trailing zeros or spaces, are 16 bytes or less. Serial number strings typically do not vary much at leading edges. Due to that, it may be desirable to truncate serial number strings at leading edges to maximize password uniqueness.

Next, in a particular implementation, sequential characters of a base string are used to replace space characters of the intermediate string (708). Due to this, the resulting intermediate string will have no spaces, in one implementation. In the implementation shown in FIG. 7D, characters Q1, Q2, Q3, Q4, Q5 and Q6 of a base string are inserted at offset addresses 0, 2, 4, 6, 29 and 31 of row 501, and overwrite the SP or character values at those positions. Specifically, Q1, Q2, Q3 and Q4 are inserted into spaces on the left side of the serial number string and Q5 and Q6 are inserted into spaces at the right side of the model number string. The number of characters of the base strings and the byte positions used can vary depending on engineering design choices or other considerations. Typically the base string is proprietary or secret in order to decrease chances of password replication. In some implementations, insertion of select characters of the base string into the intermediate string is optional when the model number or serial number strings, after pruning, are less than 16 characters long. In a particular implementation, if the base string does not have enough characters for all of the space substitutions, the offset to the base string is simply zeroed and the base string provides characters sequentially from the beginning again. In an alternative implementation, the base string is always used regardless of the existence of spaces in the serial or model number strings. In one implementation the first N characters of a base string are inserted into predetermined positions of the intermediate string.

Figure 7E:
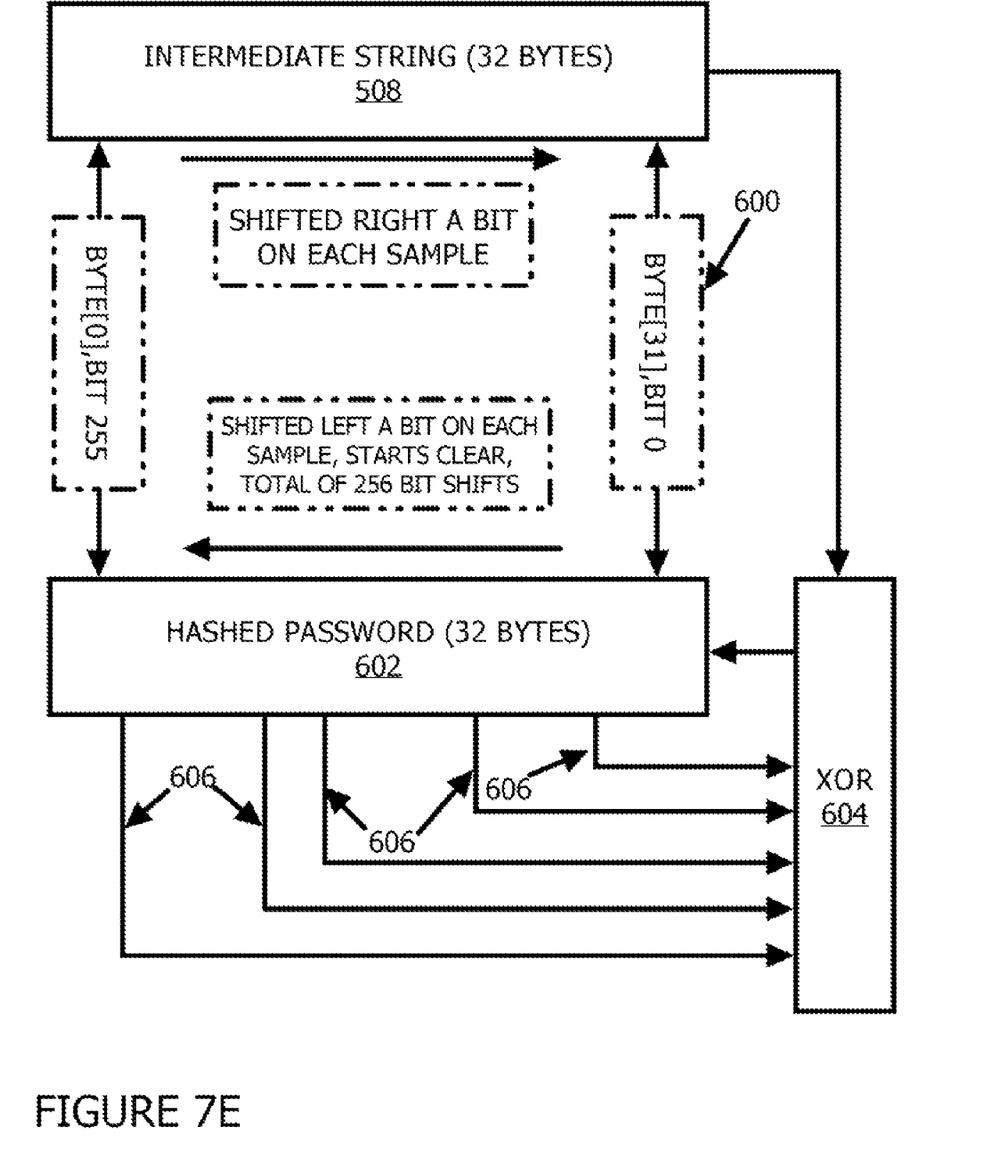
FIG. 7E is a block diagram illustrating a serializer and a feedback XOR function for generating a password, in accordance with an example embodiment.

The intermediate string of FIG. 7E is then passed through a serializer to generate the final password (710). In a particular implementation, a serializer 600 samples the intermediate string of row 508 a bit at a time as shown in FIG. 8, starting at a least significant byte 31 of row 502 and works leftward via bytes 0, 1 and so forth of row 508. In parallel, a 32 byte register 602, into which the hashed password will be created, is firstly cleared. XOR function 604 taps various offsets of register 602 as well as a current bit of the intermediate string of row 508 in order to incrementally produce a password. Placements of taps 606 at specific offsets, the direction according to which the byte string is traversed, and the starting location are design choices and may vary considerably without departing from the scope of the invention.

FIG. 8 summarizes how the password string is initially generated, according to one possible implementation of the invention. Again, the password string is typically executed by a processor of a station in a manufacturing system when a cartridge is manufactured or by a portion of MCU 40 when a cartridge 100 is inserted into carrier 200. In the context of a cartridge 100 being inserted into a carrier 200, method 700 involves MCU 40 accessing (702) a serial number string and a model number string from a hard disc drive of cartridge 100. This follows the same procedure as outlined in paragraphs 37-40 and FIGS. 7, 8.

The manufacturing system programs the password string into the cartridge 100. This utilizes the hashed password string (from above) and standard ATA security features commands.

When a cartridge 100 is inserted into a carrier 200, MCU 40 will reject the cartridge 100 if its drive is not in an locked state by default, in one implementation. Additionally, MCU 40 may send an intentionally incorrect password string to a locked drive of cartridge 100 upon insertion into a carriage 200, in one implementation. If the drive of cartridge 100 unlocks, MCU 40 rejects the cartridge 100 as its drive will most likely have been set up to accept any password string in order to fake an authentic cartridge. If the drive of cartridge 100 is locked and is not unlocked by the fake password string, MCU 40 then queries the drive of cartridge 100, via an identify command, to obtain serial and model number strings. MCU 40 then generates a password string based on the received serial number string, model number string and base string of which MCU 40 already has possession. Next MCU 40 uses the generated password string to unlock the drive of cartridge 100.

Method 800 of FIG. 9 illustrates an authentication process that may be implemented by carrier logic of carrier 200. When MCU 40 detects insertion (802) of a cartridge, it queries the drive for serial number and model number strings (803) via an Identify command. Next, the MCU 40 determines if the drive of cartridge 100 is locked by default (804). If not, MCU 40 rejects (806) the drive. If the cartridge drive is locked by default, MCU 40 applies (808) an intentionally incorrect password string and rejects the cartridge drive (810, 806) if the drive unlocks. If the drive does not unlock, MCU 40 generates (814) a password string that is used to unlock (816) the drive. If the drive does not unlock, MCU 40 rejects (806) the cartridge 100. In some implementations, the MCU 40 may pass error messages to the host controller or computing system to which carrier 200 is attached.

In one implementation, methods 700 and 800 can also be used to generate a unique user password, based on a password supplied by a user, which replaces a default drive password that is generated via method 800. The user password is then used for later drive unlocking. Upon insertion of a cartridge 100 into a carrier 200, MCU 40 issues an Identify command to the drive contained in the cartridge 100 and the drive reports to the MCU 40 that it is user password locked. The MCU 40 in turn signals a host system, to which MCU 40 is operably attached, to prompt a user for the user password. Upon receipt of the user password, MCU 40 runs method 700 by utilizing the user password in place of the model string number. The resulting password string is then utilized to unlock the drive.

While a number of exemplary aspects and embodiments have been discussed above, those of skill in the art will recognize certain modifications, permutations, additions and sub-combinations thereof. For example, the present invention may be used to authenticate other storage media, such as flash memory or other solid-state storage devices. Furthermore, the media authentication processes described herein can be incorporated into the storage driver protocol stack installed on, and implemented by, a host computing system. Accordingly, it is therefore intended that the following appended claims and claims hereafter introduced are interpreted to include all such modifications, permutations, additions and sub-combinations as are within their true spirit and scope.

What is claimed is:

1. A method comprising:
by a cartridge carrier configured to accept a removable media cartridge, the removable media cartridge comprising a hard disk drive housed within a cartridge shell:
accessing a serial number string and a model number string of the hard disk drive, wherein the serial number string and the model number string each comprise a plurality of characters;
selectively modifying one or both of the serial number string and the model number string to produce a modified serial number string and a modified model number string;
interleaving the modified serial number string and the modified model number string to form an intermediate string;
hashing the intermediate string to form an authentication password;
storing the authentication password within the hard disk drive on computer-readable storage media; and
determining if the hard disk drive is in a locked state; and
if the hard disk drive is in the locked state:
sending an incorrect password to the hard disk drive;
rejecting the removable media cartridge if the hard disk drive unlocks in response to receipt of the incorrect password by the hard disk drive;
sending the authentication password to the hard disk drive; and
rejecting the removable media cartridge if the hard disk drive does not unlock in response to receipt of the authentication password by the hard disk drive.

2. The method as recited in claim 1 further comprising inserting a select set of characters of a base string into the intermediate string.

3. The method as recited in claim 2 wherein the select set of characters of the base string are inserted at predetermined spaces of the intermediate string.

4. The method as recited in claim 1 wherein hashing the intermediate string comprises processing the intermediate string through a feedback XOR function in bit-reverse order to incrementally form the password.

5. The method as recited in claim 4 wherein the feedback XOR function samples the incrementally formed password at select offsets.

6. A cartridge carrier comprising:
a carrier comprising a carrier controller and a mating interface connector wherein the carrier is configured to accept a removable media cartridge and releasably attach the mating interface connector to an interface connector of a hard disc drive contained in the cartridge, the carrier controller comprising:
a microcontroller unit operative, when a cartridge including a hard disk drive is loaded into the carrier, to:
query the hard disk drive for a serial number string and a model number string via an identify command;
determine if the hard disk drive is locked by default; and
if the hard disk drive is locked:
send an incorrect password to the hard disk drive;
reject the cartridge if the hard disk drive unlocks in response to receipt of the incorrect password by the hard disk drive;
generate an authentication password based on interleaving the serial number string and the model number string, both received from the hard disk drive;

send the authentication password to the hard disk drive;

reject the cartridge if the hard disk drive does not unlock in response to receipt of the authentication password by the hard disk drive.

7. The cartridge carrier as recited in claim 6 wherein the microcontroller unit is further operative to reject the cartridge if the hard disk drive is unlocked by default.

* * * * *